UNITED STATES PATENT OFFICE.

OTTO LIEBKNECHT, OF FRANKFORT-ON-THE-MAIN, GERMANY.

PRODUCTION OF PERCARBONATES.

1,263,258.  Specification of Letters Patent.  Patented Apr. 16, 1918.

No Drawing. Application filed January 3, 1918. Serial No. 210,215.

*To all whom it may concern:*

Be it known that I, OTTO LIEBKNECHT, a subject of the German Emperor, and resident of Frankfort-on-the-Main, Germany, have invented certain new and useful Improvements in the Production of Percarbonates, of which the following is a specification.

My present invention relates to the production of percarbonates, and has for its object to provide a novel process of obtaining alkali-metal percarbonates from aqueous solutions.

It has been proposed to produce sodium percarbonate by dissolving a corresponding proportion of soda in a diluted solution of hydrogen peroxid containing approximately 3 per cent. of hydrogen peroxid, and adding, after some lapse of time, larger quantities of alcohol, for instance, a quantity approximately equal to three times the volume of the hydrogen peroxid solution, and thereby precipitating the percarbonate formed. Now, I have discovered that instead of the expensive ethyl alcohol, I may advantageously use separating salts, that is salts having a tendency to induce a separation of the percarbonate from the solution, for instance, readily dissolving salts, such as common salt, sodium nitrate, and others for the separation of the percarbonate. Especially the cheap common salt has been found to produce excellent results. The separating salts may already be present in the hydrogen peroxid solution with which the process is started, or the separating salts may be added during the formation of percarbonate; or the separating salts may be added to the solution after the completion of the process of forming percarbonates.

If to a hydrogen peroxid solution of 10 per cent. so much of calcined soda is added that for each one half gram of molecular hydrogen peroxid there is present one gram of molecular soda, the yield of solid percarbonate obtained after cooling, filtering, and drying, will amount but to about 60 per cent. of the hydrogen peroxid employed. Upon adding to the hydrogen peroxid so much of common salt that a salt solution of 10 per cent. results, the yield will amount to upward of 80 per cent.; and if a salt solution of 20 per cent. is produced the yield of solid percarbonate will amount to almost 90 per cent. I observed the surprising fact that the presence of such comparatively large quantities of salt as I am using did not interfere with the process itself, nor did the salt unfavorably influence the hydrogen peroxid employed. Likewise did the salt contents of the solution in no way influence the durability of the solid percarbonate obtained in accordance with my novel method.

When proceeding according to my present invention, one may start either with a diluted solution of hydrogen peroxid or with a concentrated solution of hydrogen peroxid; in any case the yield is considerably increased by an addition of somewhat similar quantities (i. e. a large proportion) of common salt or the like separating substances. I prefer to work with a solution of a limited water content, which feature I have described and claimed in another application.

I have given some examples to render my invention more clear; however, I desire it to be understood that my invention is not limited to the examples and the data given therein, but is applicable in any case where it is desired to separate percarbonates from an aqueous solution.

I have further discovered that it is very advantageous to conduct the process in the presence of protective substances such, for instance, as sodium silicate, or magnesium silicate, the yield of percarbonate from a given quantity of peroxid being thereby increased and the percarbonate rendered more stable.

What I claim as my invention, and desire to secure by Letters Patent of the United States of America, is:—

1. A process of obtaining percarbonates from aqueous solutions which comprises adding to a dilute aqueous solution of a percarbonate a salt having a tendency to induce a separation of the percarbonate from the solution.

2. A process of obtaining alkali-metal percarbonates from aqueous solutions which comprises adding to a dilute aqueous solution of alkali-metal percarbonate a large proportion of a salt having a tendency to induce a separation of the percarbonate from the solution.

3. A process of obtaining sodium percarbonate from aqueous solutions which comprises adding to a dilute aqueous solution of sodium percarbonate a large proportion of common salt.

4. A process of producing alkali-metal percarbonates which comprises adding to a dilute solution of hydrogen peroxid, containing an alkali-metal carbonate, a salt having a tendency to induce a separation of the resulting percarbonate from the solution.

5. A process of producing sodium percarbonate which comprises adding to a dilute solution of hydrogen peroxid containing sodium carbonate a large proportion of common salt.

6. A process of obtaining percarbonates from dilute aqueous solutions which comprises inducing a separation of the percarbonate from the dilute aqueous solution by means of a percarbonate-separating salt in the presence of a protective substance.

7. A process of obtaining sodium percarbonate from dilute aqueous solutions which comprises separating the sodium percarbonate from the dilute aqueous solution in the presence of common salt and a protective substance.

8. A process of obtaining alkali-metal percarbonates from aqueous solutions which comprises inducing the separation of the alkali-metal percarbonate from the aqueous solution in the presence of common salt somewhat similar in quantity to the amount of percarbonate present, and in the presence of a protective substance.

9. A process of producing alkali-metal percarbonates which comprises inducing the separation of alkali-metal percarbonate from a dilute solution of hydrogen peroxid containing an alkali-metal carbonate in the presence of a percarbonate-separating salt and a protective substance.

10. A process of producing sodium percarbonate which comprises inducing the separation of sodium percarbonate from a solution of hydrogen peroxid containing sodium carbonate in the presence of a protective substance by means of a quantity of common salt somewhat similar to the amount of percarbonate formed.

In testimony whereof I have signed my name to this specification in the presence of two subscribing witnesses.

OTTO LIEBKNECHT.

Witnesses:
WILHELM STÖTZEN,
ALMA LAUCK.